(12) United States Patent
Turley et al.

(10) Patent No.: US 7,063,285 B1
(45) Date of Patent: Jun. 20, 2006

(54) CASSETTE DEVICE FOR RELIABLE FILAMENT DELIVERY

(75) Inventors: Patrick W. Turley, Eden Prairie, MN (US); Thomas L. Taatjes, Eden Prairie, MN (US)

(73) Assignee: Stratasys, Inc., Eden Prairie, MN (US)

( * ) Notice: Subject to any disclaimer, the term of this patent is extended or adjusted under 35 U.S.C. 154(b) by 119 days.

(21) Appl. No.: 10/701,205

(22) Filed: Nov. 4, 2003

(51) Int. Cl.
*B65H 16/00* (2006.01)

(52) U.S. Cl. ............... 242/171; 242/396.1; 242/564.4; 242/566; 242/588.6

(58) Field of Classification Search ............... 242/171, 242/396.1, 564.4, 566, 588.3, 588.6
See application file for complete search history.

(56) References Cited

U.S. PATENT DOCUMENTS

| | | | |
|---|---|---|---|
| 3,614,016 A * | 10/1971 | Rieth | 242/396.1 |
| 3,917,090 A | 11/1975 | Montagnino | |
| 4,531,682 A | 7/1985 | Schroder et al. | |
| 4,534,522 A | 8/1985 | Spence | |
| 4,898,314 A | 2/1990 | Stroh | |
| 5,169,081 A | 12/1992 | Goedderz | |
| 5,465,917 A | 11/1995 | Kosch | |
| 5,939,008 A | 8/1999 | Comb et al. | |
| 6,022,207 A | 2/2000 | Dahlin et al. | |
| 6,027,068 A | 2/2000 | Lantsman | |
| 2001/0030383 A1 | 10/2001 | Swanson et al. | |

* cited by examiner

*Primary Examiner*—John Q. Nguyen
(74) *Attorney, Agent, or Firm*—Kinney & Lange, P.A.

(57) ABSTRACT

A cassette for use in delivering a continuous length of filament provides improved reliability by employing means for preventing tangling of the filament in the cassette. The cassette has a substantially closed housing defining a chamber in which a spool is rotatably mounted, and a path from the chamber to an exit orifice. A length of filament is wound around the spool and has a free strand positioned in the path. The filament strand is advanced along the path and delivered through the exit orifice by a means for advancing. Tangling is prevented by locking the spool during transport of the cassette to maintain a tight wind, and by guiding the filament strand along a snag-free path as it is withdrawn from the cassette. In the exemplary embodiments, a removable pin locks a flange or hub of the spool, and the filament strand is withdrawn through a tubular guide member.

11 Claims, 11 Drawing Sheets

CASSETTE DEVICE FOR RELIABLE FILAMENT DELIVERY

CROSS-REFERENCE TO RELATED APPLICATION(S)

None.

BACKGROUND OF THE INVENTION

This invention relates to dispensers for flexible strand materials, and particularly to cassettes that deliver modeling material in the form of a continuous filament to a machine that forms three-dimensional objects by extruding modeling material in a flowable state in three dimensions with respect to a base.

Extrusion-based layered manufacturing machines build up three-dimensional objects or models by extruding solidifiable modeling material from an extrusion head in a predetermined pattern, based upon design data provided from a computer aided design (CAD) system. A feedstock of either a liquid or solid modeling material is supplied to the extrusion head. One technique is to supply modeling material in the form of a filament strand. Where the feedstock of modeling material is in solid form, a liquifier brings the feedstock to a flowable temperature for deposition. The modeling material is extruded layer-by-layer in areas defined from the CAD model. The material being extruded fuses to previously deposited material and solidifies to form a three-dimensional object resembling the CAD model.

Examples of extrusion-based apparatus and methods for making three-dimensional objects are described in Valavaara U.S. Pat. No. 4,749,347, Crump U.S. Pat. No. 5,121,329, Crump U.S. Pat. No. 5,340,433, Crump et al. U.S. Pat. No. 5,503,785, Danforth, et al. U.S. Pat. No. 5,900,207, Batchelder, et al. U.S. Pat. No. 5,764,521, Dahlin, et al. U.S. Pat. No. 6,022,207, Stuffle et al. U.S. Pat. No. 6,067,480, Batchelder, et al. U.S. Pat. No. 6,085,957, and PCT Publication No. WO 00/78519 A1, all of which are assigned to Stratasys, Inc., the assignee of the present invention.

One technique for supplying modeling material to a three-dimensional modeling machine provides modeling filament in an enclosed cassette. This technique is disclosed in Published U.S. patent application No. 20010030383, hereby incorporated by reference number. The cassette contains spooled filament which is advanced to the machine through an exit orifice of the cassette. Use of the cassette permits automatic loading of the filament. Also, the cassette can be made air tight and sealed so that the filament can be kept in a dry environment. As many modeling materials are moisture sensitive (i.e. high-temperature thermoplastics), maintaining dryness of the filament is in some cases essential for building accurate, robust models.

In the prior art cassettes such as disclosed in Published U.S. Application No. 20010030383, the spool can rotate inside of the cassette during transport and handling. This inadvertent rotation has been discovered to cause the filament to unravel, which sometimes results in tangling or breakage. In such a case, the cassette fails to properly deliver filament to a modeling machine. Further, even without unacceptable unwinding, it has been discovered that the cassettes sometimes fail due to imperfections in the filament wrap. During production, filament is wound tightly onto the spool. Imperfections in the wrap have been found to result in snagging of the filament as it unwinds.

In the '383 patent publication, a one-way ratchet spring device 222 is disclosed for preventing backwards movement of the filament. This device was found to successfully prevent backward rotation but it did not prevent forward rotation. Rather than decrease the failure rate, this resulted in increased tangling as the spool was permitted to rotate forward thereby unwinding filament, but could not likewise rotate backwards to tighten the wrap.

In an attempt to curtail the inadvertent forward and backward rotation of spools in the filament cassettes, a piece of adhesive-backed polyurethane foam was adhered to an interior wall of the cassette, in contact with the spool. The foam added friction so as to curtail the free rotation of the spool. The foam approach was found, however, to be unsatisfactory. While the foam did curtail rotation, it did not completely eliminate it. Even the slightest bit of rotation of the spool during shipping was demonstrated to cause a snag within the can, and even the slightest snag was fatal. Further, the foam caused a new set of filament delivery problems. In some cases, the cassettes failed because the friction on the spool was too great. Too much friction would stall out filament drive motors on the modeling machines. The amount of friction added by the foam was difficult to control and resulted in large friction variations amongst the cassettes. Other problems occurred as well. Sometimes the adhesive did not hold, causing the foam to detach from the cassette and the machine to stall due to increased friction. The foam had a tendency to crumble, and foam particles could make their way into the filament load path where they could jam or plug the modeling machine. The foam was also difficult to apply and to remove from the cassettes.

It would be desirable to increase the reliability of filament delivery by filament cassettes.

BRIEF SUMMARY OF THE INVENTION

The present invention is an improved cassette for use in delivering a continuous length of filament, and a method of assembling the cassette. The cassette has a substantially closed housing defining a chamber in which a spool is rotatably mounted, and a path from the chamber to an exit orifice. A length of filament is wound around the spool and has a free strand which is positioned in the path. The filament strand is advanced along the path and delivered through the exit orifice by a means for advancing. To reduce filament delivery failure, a means is employed that prevents tangling of the filament in the cassette.

The means for preventing tangling includes a means for locking the spool and/or a means for guiding the filament strand. The means for locking is used to keep the spool from rotating during shipping and handling of the cassette. The means for guiding provides a snag-free path for the filament strand as it is withdrawn from the cassette. In the exemplary embodiments, the means for locking comprises a pin that locks a flange or hub of the spool, and the means for guiding is a tubular guide member threaded onto the filament strand.

While the cassette of the present invention is designed for use in providing modeling material to a three-dimensional modeling machine of the type that receives modeling material in filament form, it is expected that the cassette can also be used to advantage in other fields that make use of spooled flexible strand materials.

DETAILED DESCRIPTION

In the exemplary embodiments, the present invention is used in supplying filament to a modeling machine which builds three-dimensional objects by depositing molten modeling material in layers, such as is disclosed in patent Publication No. 20010030383. The present invention improves the reliability of filament delivery from an enclosed cassette by use of a means for preventing tangling of filament in the cassette. The means for preventing tangling includes a means for locking the spool and/or a means for guiding the filament strand. The means for locking keeps the spool from rotating during shipping and handling of the cassette to avoid loosening and unraveling of the filament. In the exemplary embodiments, the means for locking is a retaining pin 94 which locks a flange of the spool or a pin 284 which locks a hub of the spool. The means for guiding guides filament as it is withdrawn from the cassette, thereby providing a snag-free path and accommodating imperfections in the filament wrap. In the exemplary embodiments, the means for guiding is a tubular guide member 97.

EMBODIMENT ONE

Figure 1:
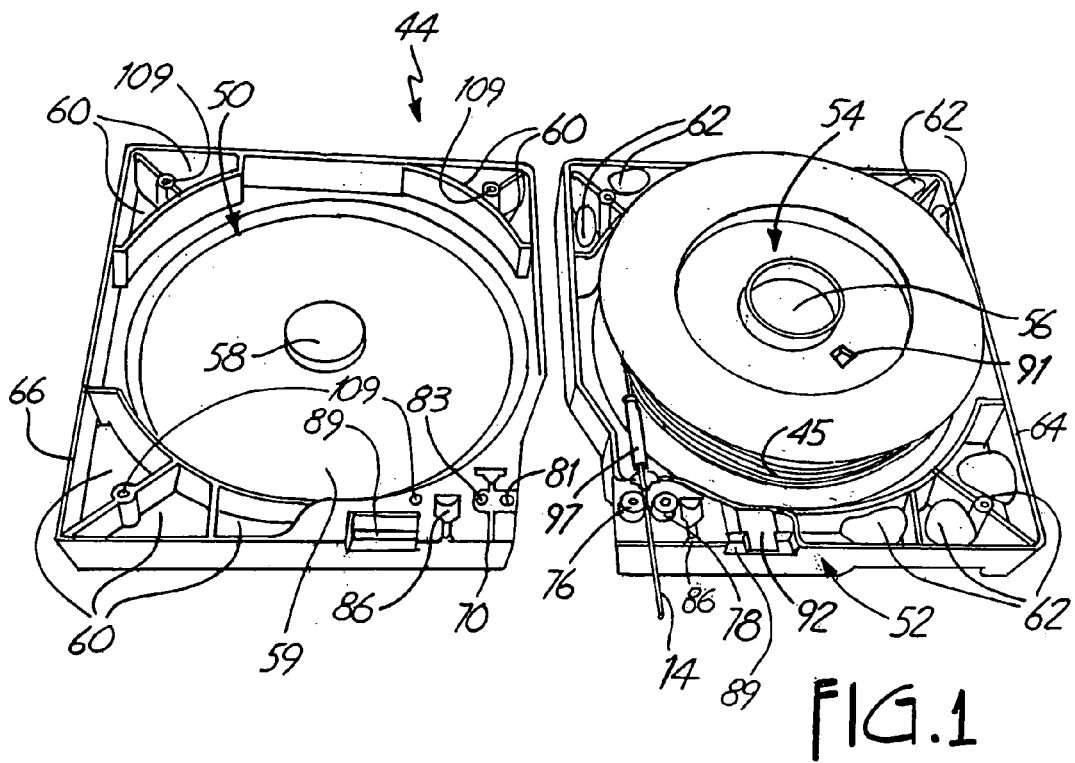
FIG. 1 is a partially exploded view of the first embodiment of a filament cassette according to the present invention.
Figure 2:
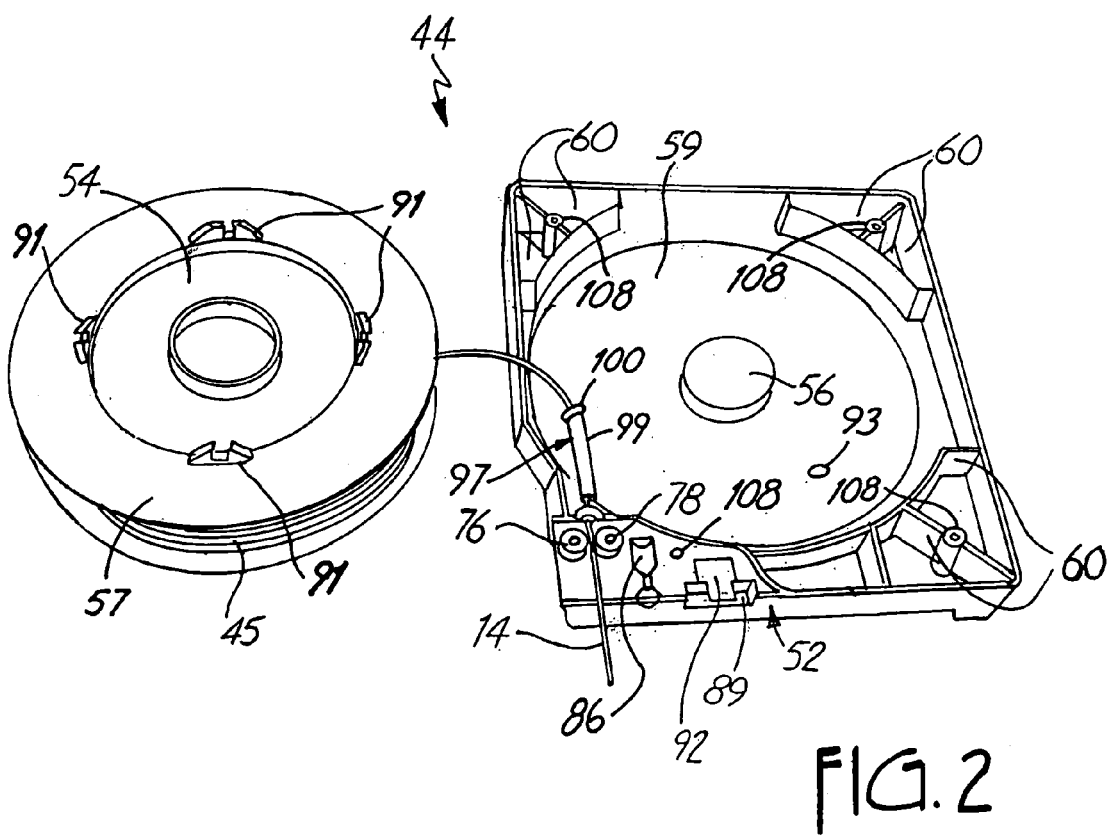
FIG. 2 is an exploded view of the spool and lower shell of the filament cassette shown in FIG. 1.

A first exemplary embodiment of the present invention is shown in FIGS. 1–5, as filament cassette 44. As shown in FIGS. 1 and 2, the filament cassette 44 is comprised of an upper shell 50, a lower shell 52, and a spool 54 carrying the filament 45. For use in three-dimensional modeling, the filament 45 is made up of a modeling material from which a three-dimensional model (or a support structure for the three-dimensional model) is to be built.

The filament 45 is wound around the spool 54 in multiple layers in any desirable manner, each layer having a plurality of windings. Typically, the windings are helical, adjacent windings traveling across the width of the spool from one side to the other, then back again. An end of the filament 45 is left unwound, providing a free strand 14.

The upper shell 50 and lower shell 52 fasten together, with the spool 54 between them. The lower shell 52 has a hub 56 and the upper shell 50 has a hub 58. A circular recess 59 within upper shell 50 and lower shell 52 surrounds each of hubs 56 and 58. Together, hubs 56 and 58 form a spindle on which the spool 54 rotates within a chamber defined by the circular recesses 59.

A narrow channel 64 is routed in lower shell 52 in a closed-loop around the periphery of the circular recesses 59 and the compartments 60. A gasket 68 is seated in the channel 64, and a ridge 66 in the upper shell 50 mirrors the channel 64. The gasket 68 blocks air from reaching the spool 54 within the cassette 44 when the upper shell 50 and the lower shell 52 are fastened together. The upper shell 50 and lower shell 52 also each have seven compartments 60 along the periphery of the recess 59, which hold desiccant packets 62.

Figure 3:
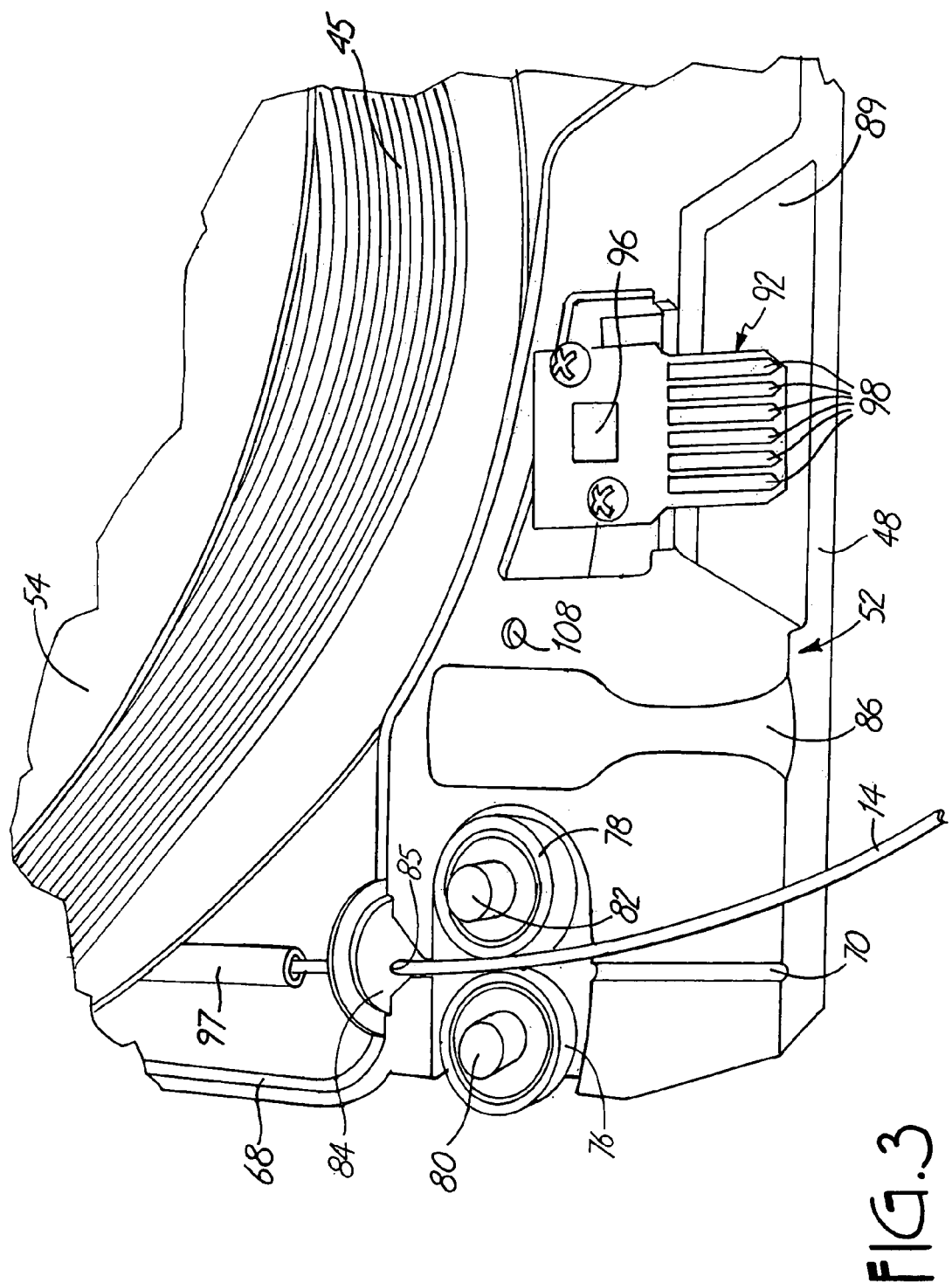
FIG. 3 is a detailed view of the partially exploded filament cassette shown in FIG. 1.
Figure 5:
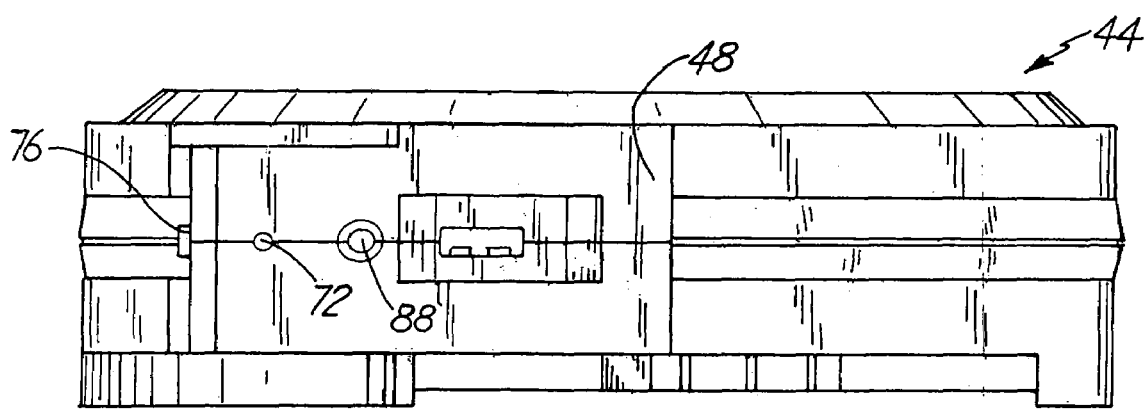
FIG. 5 is a front elevation of the first embodiment of the filament cassette.
Figure 6:
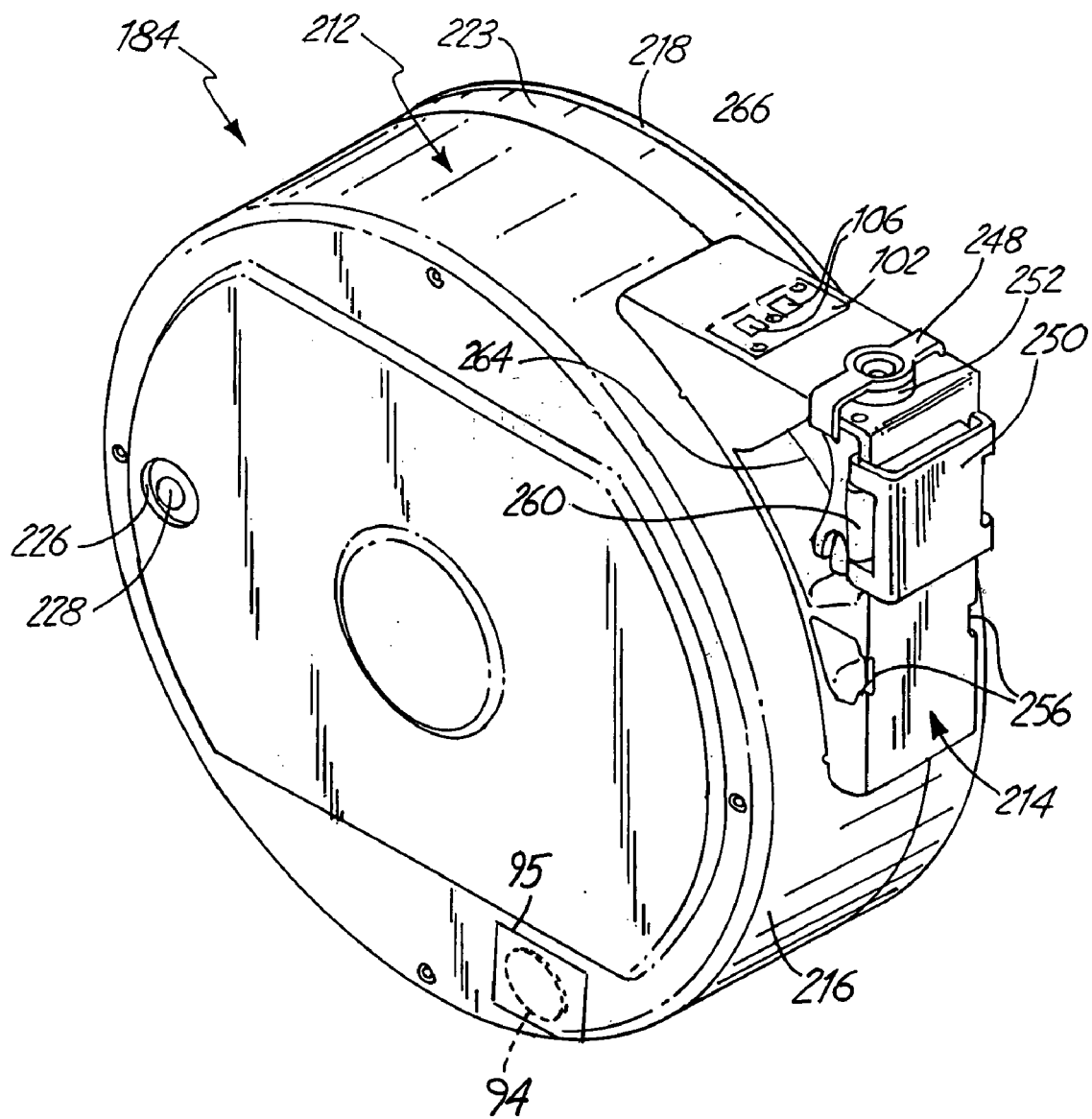
FIG. 6 is a perspective view of a second embodiment of a filament cassette according to the present invention.
Figure 7:
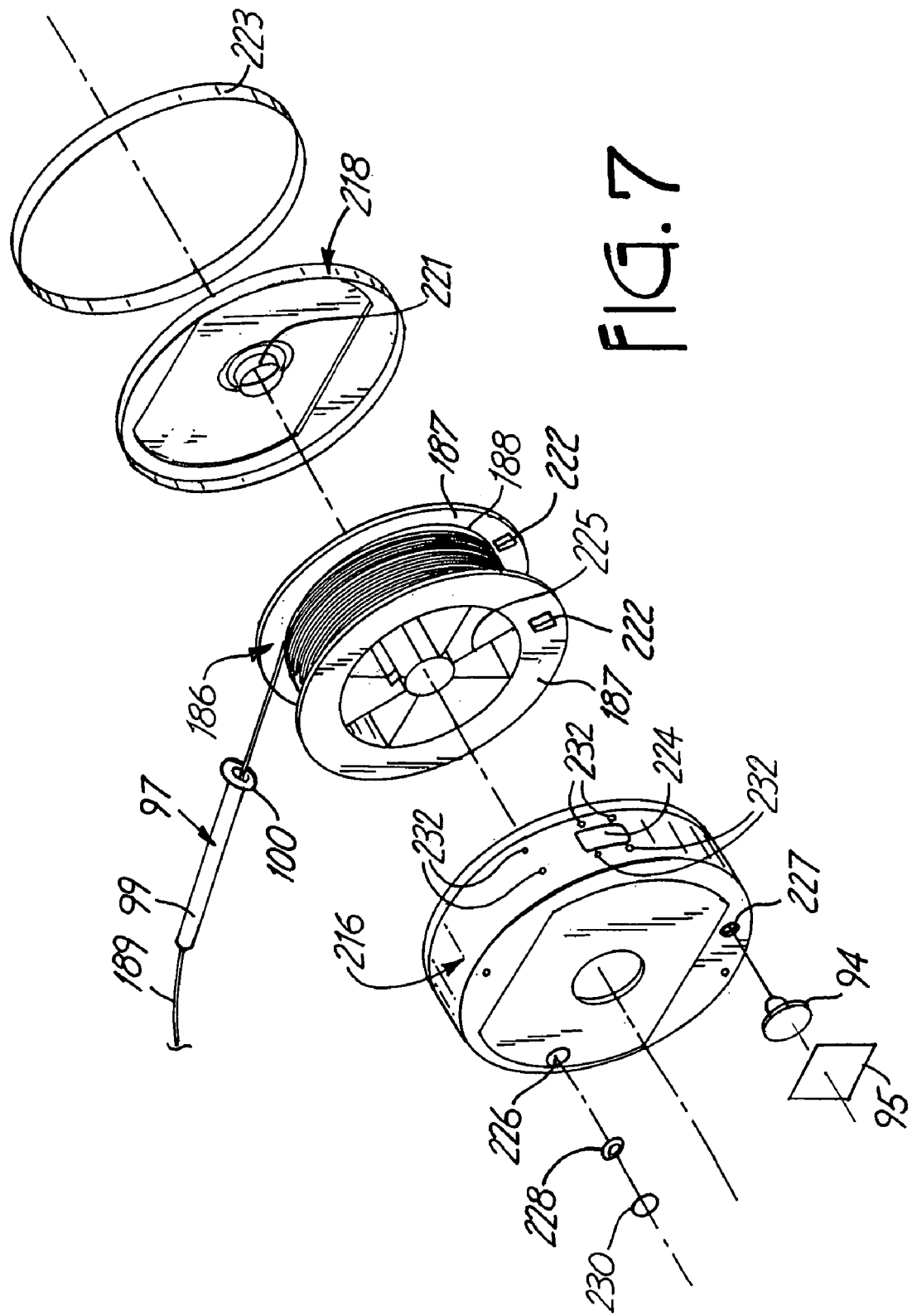
FIG. 7 is an exploded view of the second embodiment of the filament cassette (guide block not shown).
Figure 8:
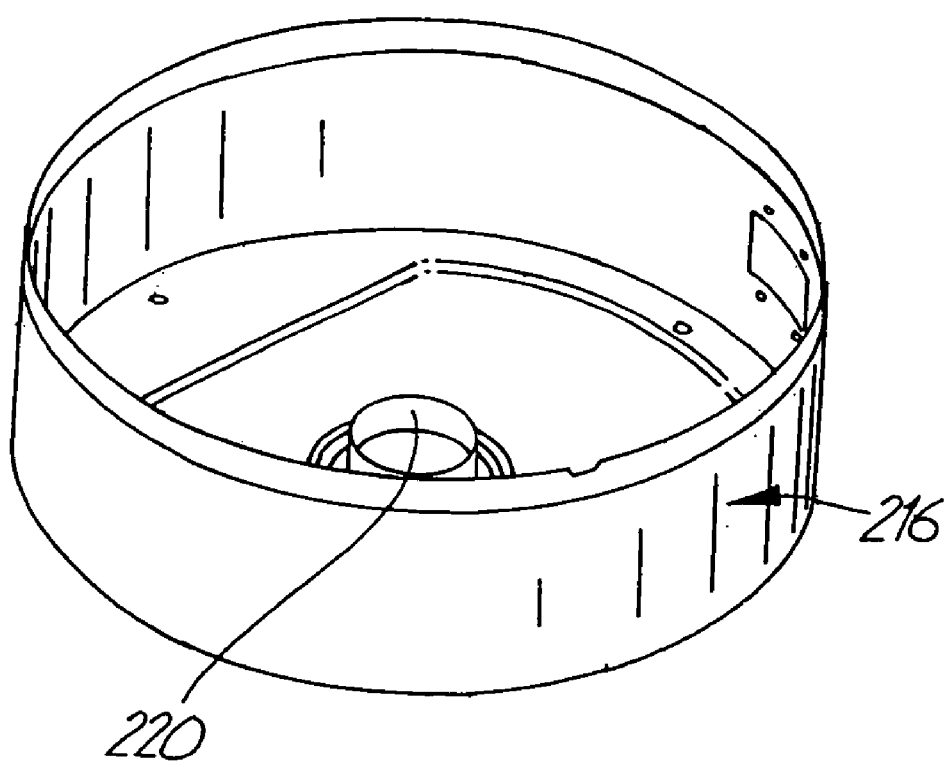
FIG. 8 is a perspective view of the canister base of the second embodiment of the filament cassette.
Figure 9:
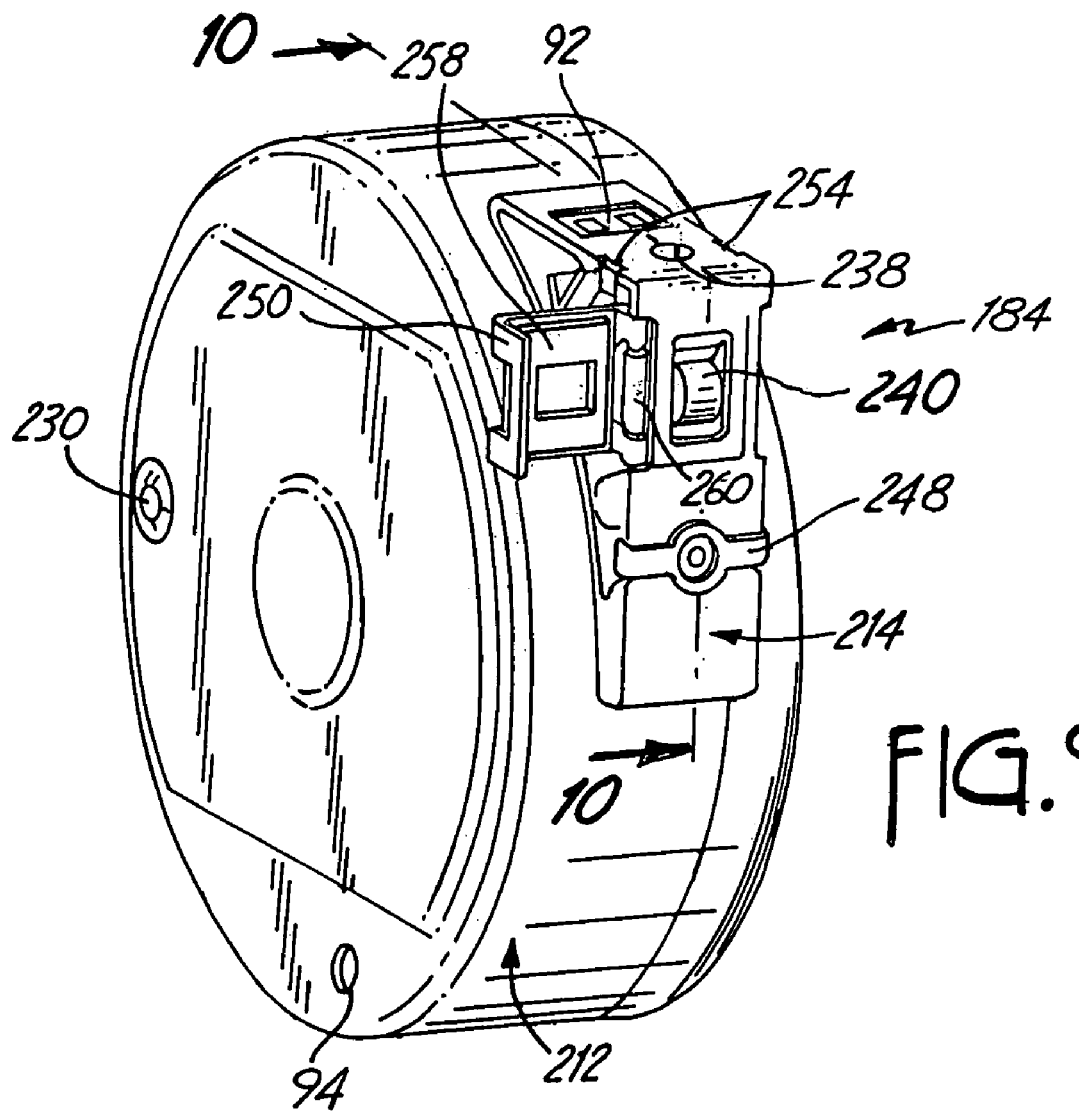
FIG. 9 is a perspective view of the second embodiment of the filament cassette, with the guide block access door open.

Each of shells 50 and 52 have a narrow channel 70 leading from the circular recess 59 to the leading edge 48 of the cassette 44, as best shown in FIG. 3. Together, the channels 70 define a path for the filament strand 14. The filament path terminates in an exit orifice 72 of the cassette 44, as shown in FIG. 5.

As is best shown in FIG. 3, a roller 76 is mounted opposite a roller 78 along the channel 70 of the lower shell 52. As shown, roller 76 rotates on a floating axle 80, while roller 78 rotates on a fixed axle 82. The floating axle 80 is seated in an oblong depression 81 of the upper and lower shells 50 and 52, oriented perpendicular to the filament path. The fixed axle 82 is seated in a cylindrical depression 83 of the upper and lower shells 50 and 52. A force applied against roller 76 will force roller 76 towards roller 78 to grip the filament strand 14 in the filament path. Alternatively, both rollers could have a fixed axle, and be positioned close enough to one another to grip the strand 14. The rollers may have an elastomeric surface, to aid in gripping the strand of filament 14.

Figure 4:
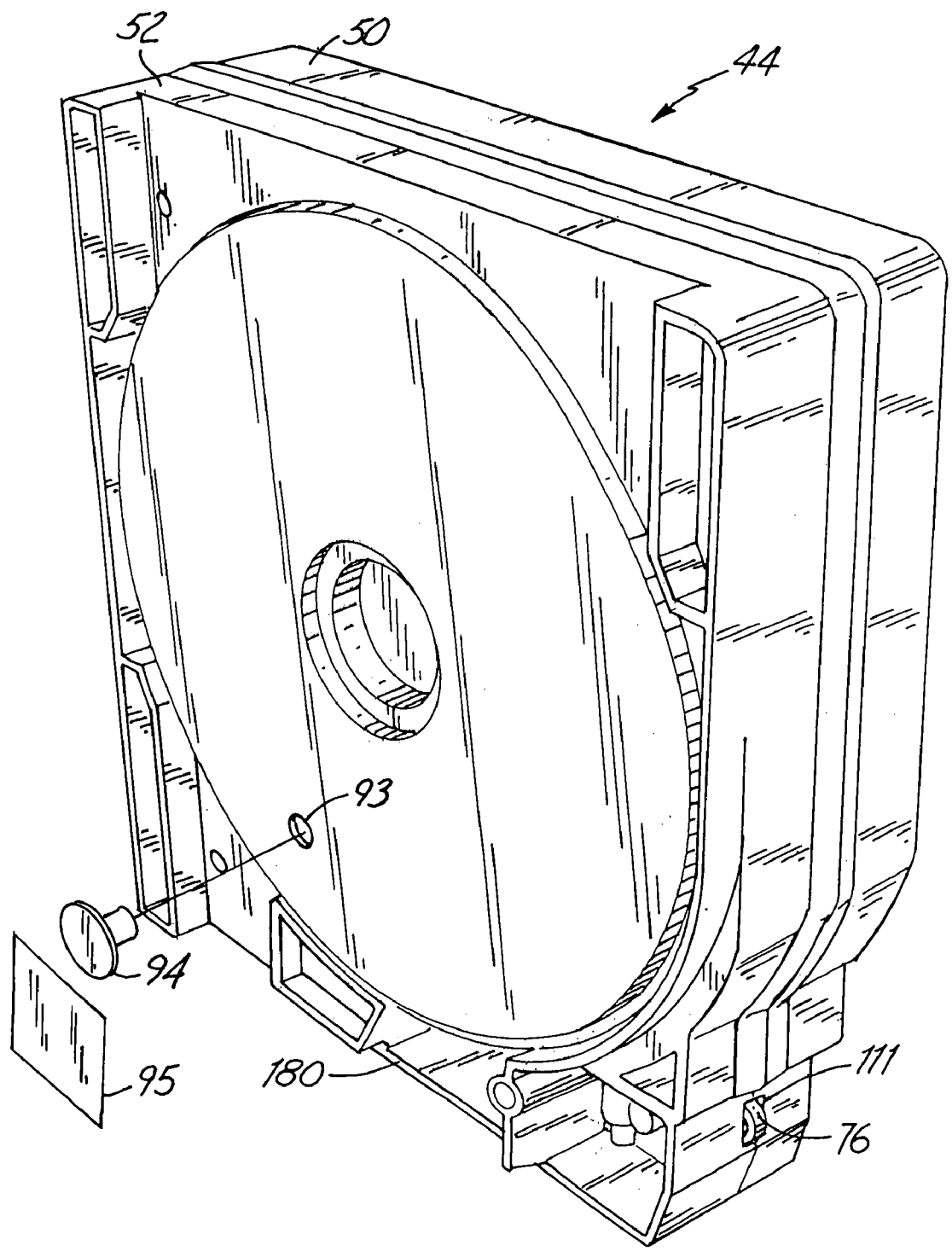
FIG. 4 is a perspective view of the first embodiment of the filament cassette.

FIG. 4 shows the assembled filament cassette 44. As shown, the roller 76 protrudes from an opening 111 in the right side of the cassette 44 so that it may receive an external rotational force to advance the filament strand 14 out of the exit orifice 72.

Channels 64 and 70 of lower shell 52 cross at a position located between the circular recess 59 and the roller pair 76 and 78, as is best shown in FIG. 3. A retainer 84, which is integral with the gasket 68, is positioned at this location. The retainer 84 has a center hole 85 of a diameter approximately equal to the filament diameter. As shown, the filament strand 14 is fed through the retainer 84, and positioned in the path so that it may be advanced out of the exit orifice 72.

Also, the filament strand 14 is fed through the tubular guide member 97, which it travels through before it reaches the retainer 84. Tubular guide member 97 is comprised of an elongated body 99 and an integrated bobber 100. The bobber 100 provides an inlet to the guide member 97, and has a diameter greater than that of the body 99. The bobber 100 has a smooth, rounded exterior surface and is substantially rigid. The guide member 97 with its bobber 100 provides a snag-free path for the filament strand 14.

The opening through the tubular guide member 97 is sized slightly larger than the average diameter of the filament. As an example, if the filament is 0.070 inches in diameter, the tubular guide member may have an inner diameter of about 0.125 inches. The body 99 of the tubular guide member for this filament may have an external diameter of about 0.25 inches, while the bobber may be about twice this diameter. The outlet of the tubular guide member may be slightly flared to soften the angle at which filament is withdrawn. For the first exemplary embodiment, the length of the tubular guide member 97 is constrained by the distance from the retainer 84 to the spooled filament 45. The guide member 97 should be short enough so that it will float on the filament strand 14, but long enough to effectively reduce the sharpness of the angle taken by the filament strand 14 as it travels from the spool 54 to the path.

Each of shells 50 and 52 have another channel 86 which runs parallel to the channel 70. Together, the channels 86 define a registration pin receiving cavity 88, which begins at the leading edge 48 of the cassette 44 and terminates before reaching the gasket 68. Cavity 88 has a flared mouth followed by a narrow neck. The mouth of cavity 88 is shown in FIG. 5. Each of upper shell 50 and lower shell 52 have a recess 89 to the right of the channel 86, which together form a recess in the leading edge 48 of the cassette 44. On the lower shell 52, a circuit board 92 is mounted in the recess 89. The circuit board 92 carries an EEPROM 96 on its upper surface and has conductive tabs 98 on a portion thereof which extends across the recess 89, so that it may be received by a card-edge connector on a modeling machine.

The filament cassette 44 is assembled by placing the spool 54 carrying the filament 45 on the hub 56 of the lower shell 52. The lower shell 52 is prepared by pressing the gasket 68 into the channel 64, so that the center hole 85 of the retainer is aligned in the channel 70. The circuit boards 92 is fastened to the lower shell 52. The fixed axle 82 carrying roller 78 is placed into the cylindrical depression 82 of the lower shell 52, while the floating axle 80 carrying roller 76 is placed into the oblong depression 81 of the lower shell 52.

The retaining pin 94 according to the present invention is then inserted into a hole 93 in the lower shell 52 of cassette 44, and into a corresponding notch 91 in a flange 57 of the spool 54. As shown, the flange 57 has four raised notches 91 on an outward face thereof. The pin 94 is inserted by aligning one of the notches 91 with the hole 93, and pushing the pin 94 through the two openings so that its head is seated against the outside of shell 52. An adhesive substrate 95 is adhered to the cassette 44 on top of the pin 94, restraining the pin 94 and preferably also providing a moisture barrier. The pin 94 keeps the spool from rotating in the cassette 44 during transport and handling.

The filament strand 14 is threaded through the bobber 100 of the tubular guide member 97, through the retainer 84, placed in the channel 70 of lower shell 52 between the rollers 76 and 78, and passed through the exit orifice 72.

Where dry conditions are desired inside of the cassette 44, a packet of desiccant 62 is preferably placed in each of the compartments 60. The upper shell 50 and lower shell 52 are fastened together by a set of four screws not shown. Alternatively, any known fastening device could be used. The screws are set into four screw holes 108 of the lower shell 52, and extend into four threaded screw holes 109 of the upper shell 50.

With the spool 54 locked into place, the filament strand 14 is pulled tight, removing any slack in the spooled filament 45. Then, the filament strand 14 is secured so that the filament 45 is held in tension. Securing of the filament strand 14 may be done by wrapping a piece a tape around the filament where it exits the cassette 44, or by other means as will be apparent to those skilled in the art. Any loose end of the filament strand 14 protruding from the cassette 44 may then be cut off. Locking the spool 54 with the filament held in tension keeps the spooled filament from loosening, settling and becoming tangled in the cassette.

For moisture sensitive materials, the chamber of the cassette 44 containing the spooled filament should be dried. Suitable drying methods are disclosed in the '383 patent Publication, and include a desiccant drying method and an oven drying method.

The pin 94 is subsequently removed by a user when loading the cassette 44 into a modeling machine. For moisture sensitive materials, the user immediately re-adheres the adhesive substrate 95 to the cassette 44 upon removal of the pin 94, covering the hole 93. As filament 45 is withdrawn from the cassette 44, the bobber 100 of the tubular guide member 97 glides from one side of the spool to the other as a layer of windings withdraw.

It has been found that without the tubular guide member 97, the filament has a tendency to tangle and break as it is being unwound from the cassette. With the tubular guide member 97, the failure rate is significantly reduced. The tubular guide member has been demonstrated to prevent tangling and breakage as the filament is drawn from the interior of the cassette. Further, it has been demonstrated that the tubular guide member 97 allows for variance in the quality of the filament wrap. Filament that may be buried due to a poor quality wrap or an unravel situation is guided off the spool and into the path.

After the filament 45 contained within the cassette 44 is depleted or otherwise becomes unusable, the cassette 44 can be refilled and reused by detaching the shells 50 and 52 and replacing the filament 45 on the spool 54.

EMBODIMENT TWO

FIGS. 6–10 show a second exemplary embodiment of a filament cassette 184. As shown, the filament cassette 184 is comprised of a canister 212, a guide block 214, and a spool 186. The spool 186 has two flanges 187 and carries a coil of filament 188. The canister 212 is formed of a body 216, and a lid 218 that presses onto the body 216. The interior of canister 212 defines a chamber containing the spool 186. The spool 186 rotates on a hub 220 of the body 216 and a hub 221 of the lid 218. The guide block 214 is attached to the body 216 at an outlet 224, and provides an exit path 236 terminating an exit orifice 238 for a free strand of filament 189. The guide block 214 is fastened to the canister body 216 by a set of screws (not shown) which extend through six screw holes 232 in the body 216 (shown in FIG. 7).

Like the first embodiment, the second exemplary embodiment uses the retaining pin 94 and guide member 97 to prevent tangling of filament in the cassette 184. As in the first embodiment, the filament strand 189 is fed through the guide member 97, which is travels through before reaching the exit orifice 238. The guide member 97 guides the filament strand 189, preventing tangling and breakage of the strand 189 as it is withdrawn from the cassette 184.

For filament 188 made of moisture sensitive material, the cassette 184 is made air tight. The canister 212 and guide block 214 are made of materials that block water vapor transmission, such as sheet metal and polypropylene, respectively. A strip of moisture-impermeable tape 223 seals the lid 218 to the body 216. Moisture can be withdrawn from the cassette 184 through a hole 226 in the canister body 216, and the hole 226 sealed with a plug 228. Preferably, a piece of moisture-impermeable tape 230 is placed over the plug 228 to further seal the hole 226. Alternatively, the hole 226 can be eliminated and the cassette 184 can be dried by loading the chamber with desiccant.

Figure 10:
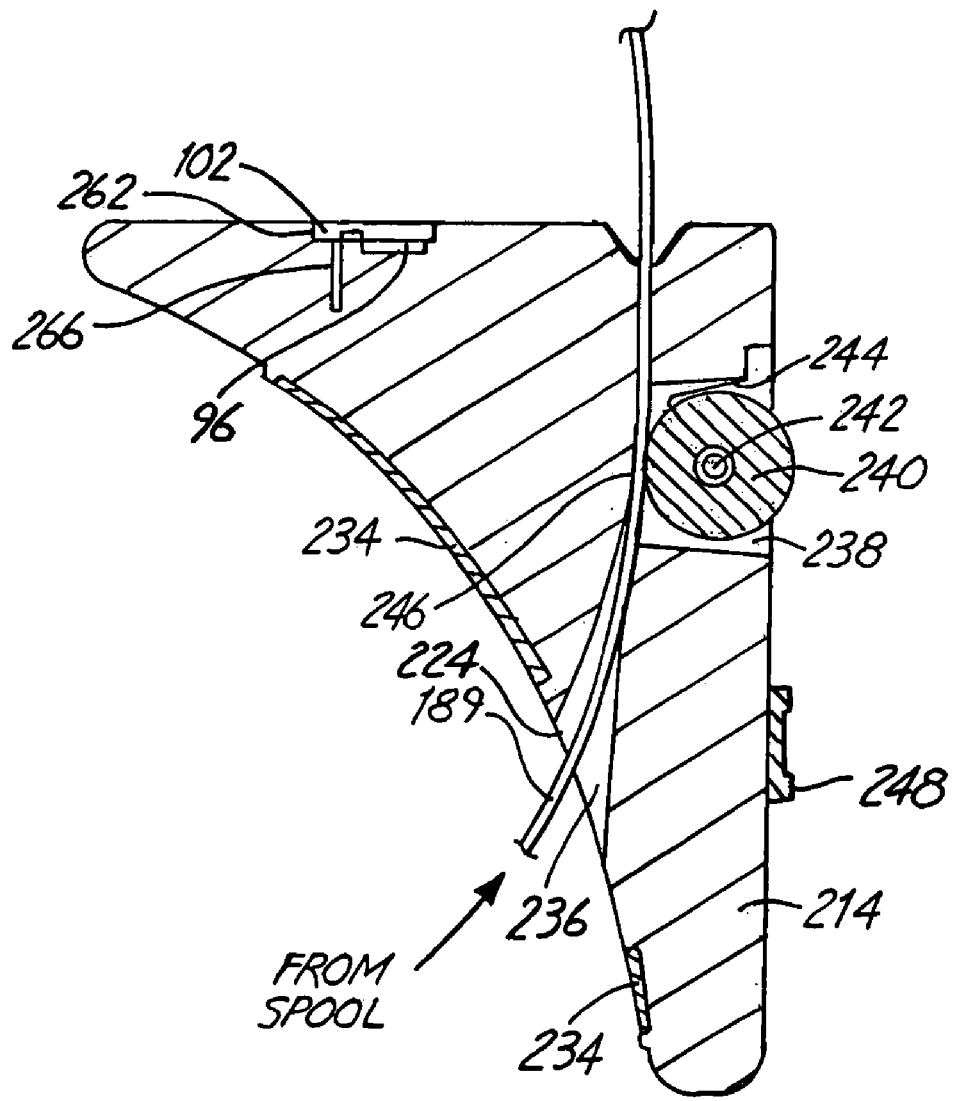
FIG. 10 is a sectional detailed view of the filament cassette shown in FIG. 9, taken along a plane 10—10 thereof.

As shown in FIG. 10, the filament strand 189 is fed through outlet 224 into the filament path 236 in the guide block 214. The filament path 236 extends through the guide block 214, terminating in the exit orifice. Adjoining the filament path 236, the guide block 214 has a chamber 238 in which a traction surface roller 240 is mounted on a pin 242. The pin 242 is mounted so that the roller 240 grips the filament strand 189 in the path 236 against a wall 246. The filament strand 189 is advanced out of the exit orifice 238 of the filament cassette 184 for loading in a modeling machine by rotating the roller 240 in a clockwise direction. The surface of roller 240 is, for example, knurled or rubber-coated to grip the filament. Alternatively, as will be apparent to those skilled in the art, the traction surface roller 240 could be replaced by some other means for advancing the filament strand. For example, the wall 246 could have a raised contour allowing a user to apply a manual propulsion force to the filament over the contour. Further, the raised counter could be defined by an idler rollers or an idler roller could be used in combination with the traction surface roller 240.

For filament 188 formed of moisture sensitive material, air flow to the filament path 236 is prevented. The guide block 214 has a removable plug cap 248 that seals the exit orifice 238, and a door 250 that encloses the chamber 238. The plug cap 248 snap-fits onto a pair of grooves 254 on the guide block 214, so that a compressible seal 252 on the underside of the plug cap 248 covers the exit orifice 238. The plug cap 248 is removed by the user at the time of inserting the cassette 184 into a modeling machine. Preferably, the guide block has a second set of grooves 256 on which the plug cap 248 may be parked when it is removed from the first set of grooves 254. The door 250 has a compressible seal 258 on an interior surface thereof, and pivots on a hinge 260. When the door 250 is open, the roller 240 is accessible to a user. The door 250 is opened by a user to load filament into a machine, and kept closed otherwise. A compressible seal 234 is placed between the guide block 214 and the canister body 216 to further seal the cassette 184.

The guide block 214 of canister 212 may carry an EEPROM 96 (described with respect to embodiment one above). A circuit board 102 carrying EEPROM 96 is mounted in a depression 262 of the guide block 214, with a pair of electrical contacts 106 facing out for access by an external connector, and the EEPROM 96 facing in.

It has been found that when the filament strand 189 is pinched tightly between the roller 240 and the wall 246, the force needed to advance filament out of the cassette 184 tends to cause the drive mechanism of a modeling machine to stall out. In order to reduce the drive force needed to advance filament into the machine, the pin 242 on which roller 240 is mounted may be set in an oversized hole to permit variation in the force it imparts against the filament strand 189. The compressible seal 258 carried inside of door 250 is then used to vary this force, by making it removable by the user. When the door 250 is shut with the seal 258 in place, the seal 258 is pushed against the roller 240, forcing the roller 240 to pinch tightly against the filament strand 189. This provides a lock on the filament strand 189. Upon installation of the cassette 184 in a machine, the user is instructed to remove the seal 258 from the door 250. With the seal 258 removed, the force imparted on the filament strand 189 by the roller 240 is lessened, permitting easier withdrawal of filament by the machine.

The filament cassette 184 is assembled by placing the spool 186 carrying the filament 188 on the hub 220 of the body 216. The filament strand 189 is fed through the bobber 100 of the tubular guide member 97, into the filament path 236 of the guide block 214, and out the exit orifice 238. The retaining pin 94 is inserted into a hole 227 of the canister 212 and a corresponding slot 222 in one of the flanges 187 of the spool 186, thus locking the spool. The adhesive substrate 95 is adhered to the canister 212 over the pin 94 to restrain the pin 94 and preferably provide a moisture barrier.

Optionally, packets of desiccant 62 (such as shown in regards to embodiment one) are placed in compartments defined by spokes 225 of the spool 186. The lid 218 is pressed onto the body 216, and the tape 223 is applied.

With the spool 186 locked into place, the filament strand 189 is pulled tight, removing any slack in the spooled filament 188. Then, the filament strand 189 is secured so that the filament 188 is held in tension. In the preferred embodiment, the filament strand 189 is secured by closing the door 250, pressing the seal 258 against the roller 240. Any loose end of the filament strand 189 protruding from the canister 212 is cut off before closing the door 250. Alternate means for securing the filament will be apparent to those skilled in the art, for instance the pin 242 may be maintained in a position where roller 240 provides a constant pinch force. Locking the spool 186 with the filament held in tension keeps the spooled filament 188 from loosening, settling and becoming tangled in the cassette.

For moisture sensitive materials, the cassette 184 containing the spooled filament should be dried to a level at which the moisture content will not impair model quality. Multiple techniques may be used to dry the filament, as mentioned above.

As with the first embodiment, the pin 94 locks the spool 186 in place during transport and handling, and is removed by a user prior to loading filament in a modeling machine. Also as with the first embodiment, as filament is withdrawn from the cassette 184, the bobber 100 of the tubular guide member 97 glides from one side of the spool to the other as a layer of windings withdraw, significantly reducing the failure rate by providing a snag-free path. The cassette 184 may be refilled and reused after the filament 188 that it contains becomes depleted or unusable.

EMBODIMENT THREE

FIGS. 11–14 show a third exemplary embodiment of the present invention, in which an alternative means for locking the spool is used in place of retaining pin 94, in a filament cassette as described in the first exemplary embodiment. In this embodiment, the spool is locked in place by a pin which secures its hub.

A hub lock 282 of the third exemplary embodiment comprises a hub-locking pin 284, a cassette hub 300, and a spool ring 298. The hub-locking pin 284 of the third exemplary embodiment has a circular base 290, a serrated edge 296 around the periphery of the base 290, a set of four receiving holes 294 extending through the base 290, and a grip 292 extending up from the base 290.

The spool ring 298 defines a hub 286 of a filament spool 288. The spool ring 298 has a serrated interior surface, which mates with the serrated edge 296 of the hub-locking pin 284. Positioning the pin 284 in the spool ring 298 engages the pin 284 with the spool 288.

In order to restrain rotational movement of the interlocked pin 284 and spool 288, a set of four bosses 304 are provided on the cassette hub 300. The bosses 304 project towards the spool 288 and mate with the holes 294 of the pin 284. The cassette hub 300 further has a central hole 306, through which the pin grip 292 extends when the pin 284 is inserted in the spool ring 298. With the pin 284 positioned in the spool ring 284, and the cassette assembled, the spool 288 cannot rotate within the cassette. In order to hold the pin 284 in place, an adhesive substrate 308 is placed on the underside of the base 290, with the bosses 304 of the cassette hub 300 placed in the receiving holes 294. The adhesive substrate makes a breakable bond between the pin 284 and the cassette hub 300. Those skilled in the art will recognize alternative means for retaining the pin 284 in a locked position. For instance, the hub-locking pin could include a mechanical holding apparatus, that would replace the adhesive substrate 308.

To use a cassette which employs hub lock 284, the breakable bond between the pin 284 and the cassette hub 300 is broken. The bond may be manually released by a user without opening the cassette, by pushing on the grip 292 of the pin 284. With the adhesive bond broken, and force placed on the grip 292, the pin 284 will be pushed out of engagement with the bosses 304, thereby releasing the anti-rotational lock on the spool 288.

Figure 11:
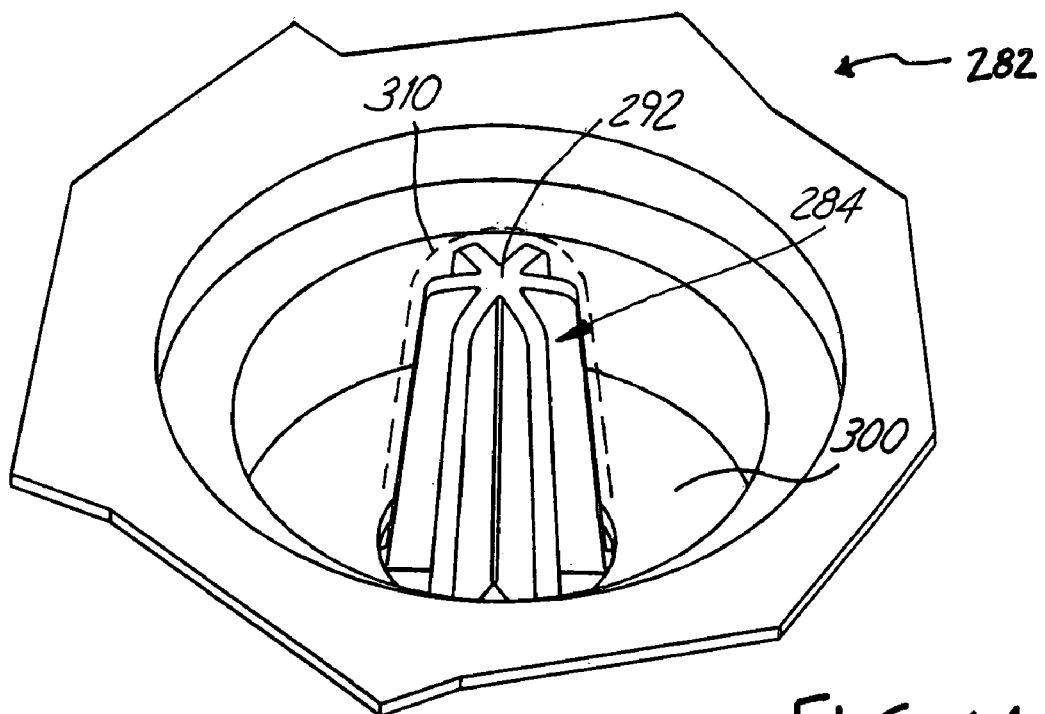
FIG. 11 is a perspective, detailed view of a third embodiment of a filament cassette according to the present invention, showing a hub lock.
Figure 12:
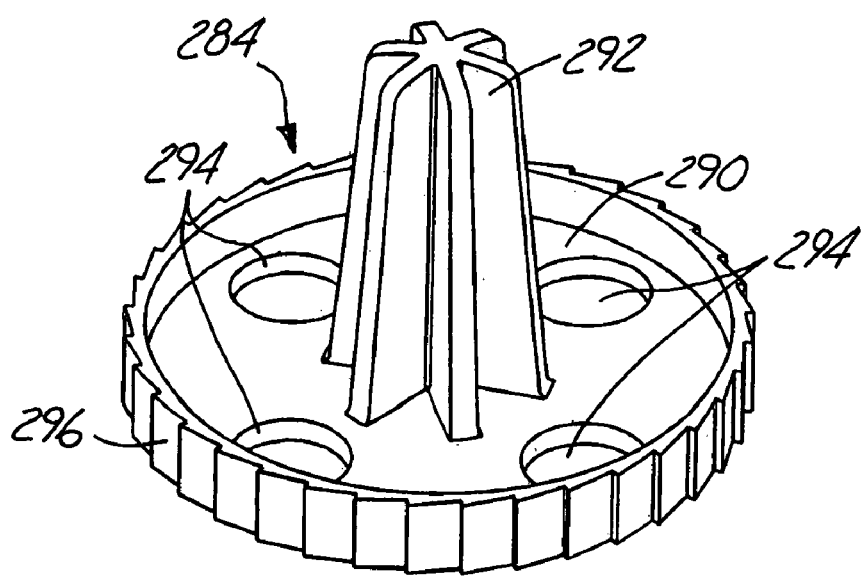
FIG. 12 is a perspective view of a hub-locking pin, which forms a portion of the hub lock shown in FIG. 11.
Figure 13:
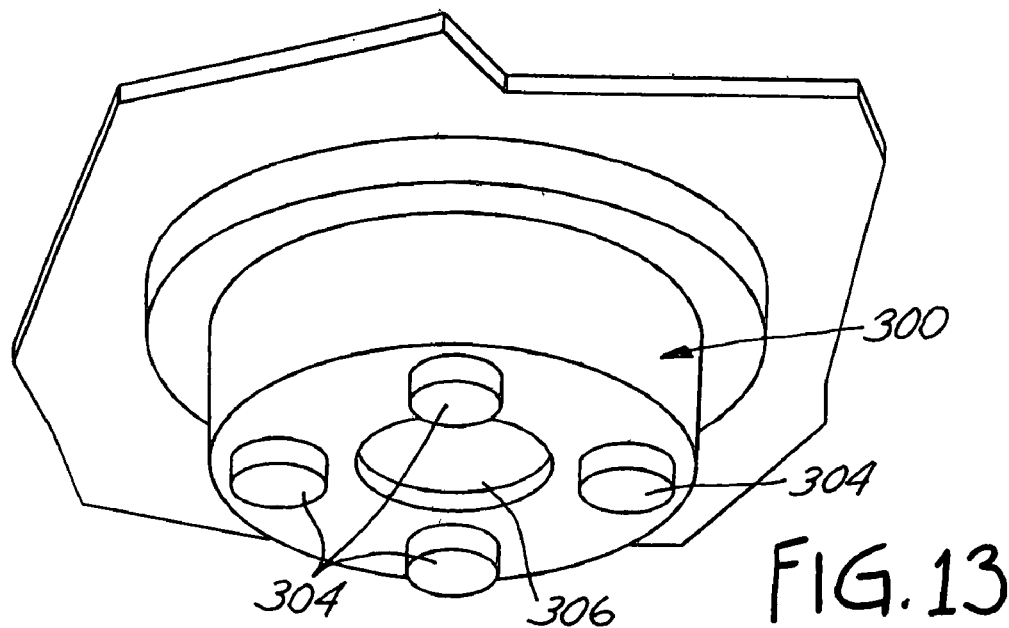
FIG. 13 is perspective view of a cassette hub according to the third embodiment of the filament cassette, which forms a portion of the hub lock shown in FIG. 11.
Figure 14:
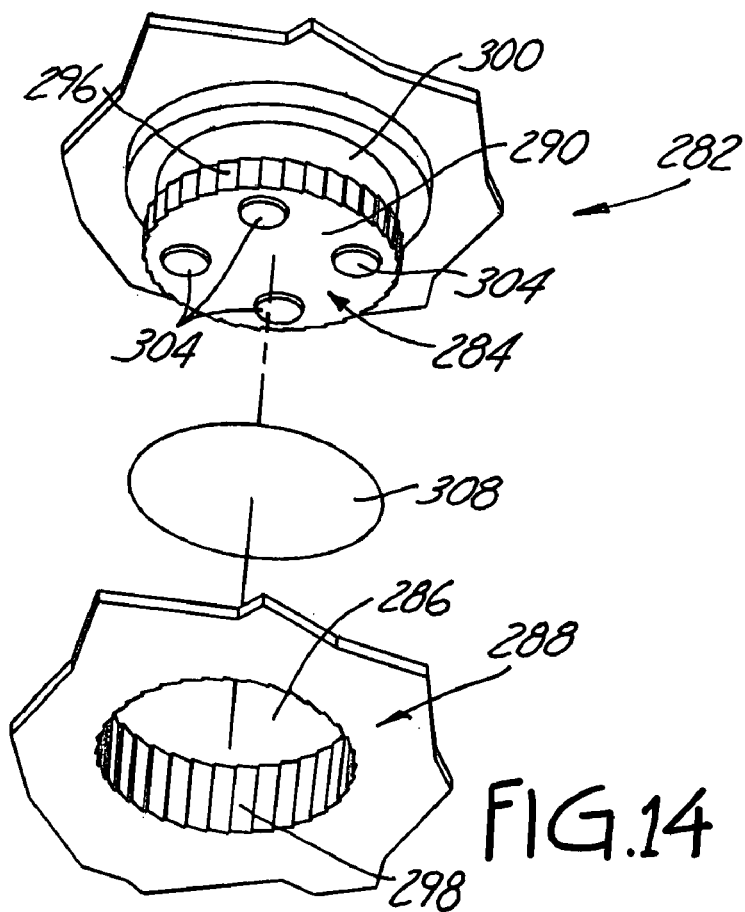
FIG. 14 is a partially exploded view of the hub lock shown in FIG. 11.

Optionally, the hub lock 282 may be sealed to keep out moisture and other contaminants. As shown in FIG. 11, a seal 310 projects up from the hole 306 in the cassette hub 300, covering the grip 292 of the pin 284. The seal 310 may be in the form of flexible rubber gasket.

Although the present invention has been described with reference to exemplary embodiments, workers skilled in the art will recognize that changes may be made in form and detail without departing from the spirit and scope of the invention. For instance, alternate mechanical locking devices can be used in place of pin 94 to secure a spool by its flange during transport and handling of the cassette, as will be recognized by those skilled in the art. Alternate mechanical locking devices can be used in place of hub lock 282 to secure a spool by its hub, as will be recognized by those skilled in the art. Likewise, alternate embodiments of a tubular guide member could be used to guide filament as it is withdrawn from the cassette, also as will be recognized by those skilled in the art.

Additionally, it will be apparent to those in the art that the filament cassette of the present invention may be used to advantage in applications other than the building of three-dimensional models. Other changes may be made as well in keeping with the scope of the invention. Such changes will be apparent to one skilled in the art.

The invention claimed is:

1. A cassette for use in delivering a continuous length of filament, comprising:
   a spool having a flange with a recess that is rotatably mounted in a chamber of a substantially closed housing;
   a length of filament wound around the spool and having a free strand at an end thereof;
   a path from the chamber to an exit orifice, in which the filament strand is positioned;
   a floating tubular guide member through which the filament strand passes as it travels from the spool to the exit orifice;
   means for advancing the filament strand through the exit orifice; and
   a removable pin that is inserted into a recess in the cassette and the recess in the spool when the recesses are aligned to prevent the spool from rotating with respect to the cassette during transport of the cassette.

2. The cassette of claim 1 and further comprising an adhesive substrate positioned over the removable pin.

3. The cassette of claim 1, wherein the cassette further comprises a means for drying the filament while the removable pin is inserted into the recess in the cassette and the recess in the spool.

4. A cassette for use in delivering a continuous length of filament, comprising:
   a spool rotatably mounted in a chamber of a substantially closed housing;
   a length of filament wound around the spool and having a free strand at an end thereof;
   a path from the chamber to an exit orifice, in which the filament strand is positioned;
   a floating tubular guide member through which the filament strand passes as it travels from the spool to the exit orifice;
   means for advancing the filament strand through the exit orifice; and
   a locking pin inserted through aligned recesses of the cassette and the spool.

5. The filament cassette of claim 4, and further comprising an adhesive substrate positioned over the pin.

6. The filament cassette of claim 4, wherein the pin is inserted into a flange of the spool.

7. The filament cassette of claim 4, wherein the pin engages a hub of the spool.

8. The filament cassette of claim 7, and further comprising a cassette hub having a plurality of bosses which project into recesses in the pin, to thereby prohibit rotational movement of the pin engaged in the spool hub.

9. A cassette for use in delivering a continuous length of filament, comprising:
   a spool rotatably mounted in a chamber of a substantially closed housing;
   a length of filament wound around the spool and having a free strand at an end thereof;
   a path from the chamber to an exit orifice, in which the filament strand is positioned;
   means for advancing the filament strand through the exit orifice; and
   a floating, tubular guide member through which the filament strand passes as it travels from the spool to the exit orifice.

10. The cassette of claim 9, wherein the tubular guide member comprises an elongated body coupled to a substantially-rigid bobber, wherein the filament strand enters the guide member through the bobber.

11. A method of assembling the cassette of claim 1, comprising the steps of:
   loading the spool of filament into the chamber,
   threading the filament strand through the floating tubular guide member;
   positioning the filament strand in the path;
   holding the filament in tension; and
   inserting the pin.

* * * * *